> United States Patent Office 3,463,847
Patented Aug. 26, 1969

3,463,847
METHOD OF PRODUCING IMPROVED POLY-AMIDIC FIBROUS MATERIAL HAVING THREE DIMENSIONAL CRIMPABILITY
Keizo Ueda, Nishinomiya, Satoshi Ando, Osaka, and Tetsuo Kinoshita, Kobe, Japan, assignors to Kanegafuchi Boseki Kabushiki Kaisha, Tokyo, Japan, and to Snia Viscosa Societa Nazionale Industria Applicazioni Viscosa S.p.A., Milan, Italy
No Drawing. Filed Dec. 12, 1966, Ser. No. 600,765
Int. Cl. D02j 1/00
U.S. Cl. 264—168                    12 Claims

ABSTRACT OF THE DISCLOSURE

Composite polyamide fibers with superior three-dimensional crimp, bonding property, elasticity and dyeability are produced by conjugate-spinning of a conventional polyamide, such as nylon, and a copolymer of a polyamide with a heterocyclic diamine-dicarboxylic acid salt, such as the salt of N.N'-di(γ-aminopropyl)piperazine with adipic acid or 4-amino-3, 5-di(aminoalkyl)-1,3,4-triazole.

---

The present invention relates to a method of producing novel polyamide fibre having a three dimensional crimpability, wherein two polyamidic polycondensates to be described hereinafter are spun simultaneously through a same orifice to provide fast three dimensional crimp to the polyamide fibre.

Some methods of producing crimpable fibre that is, so-called conjugate spinning processes, wherein different polymers are spun simultaneously through the same orifice to produce a unitary composite filament, have been already attempted, but there have been many difficulties in bonding property of the two polymers, crimpability, physical property of crimped fibre, etc.

An object of the invention is to produce a novel composite polyamide filament having superior bonding property and crimpability as compared to conventional fibres and highly improved elasticity and dyeing affinity. A purpose for producing crimped fibre is to provide bulkiness to the fibre, but the bulkiness is not obtained by a good crimpability alone, but requires a good crimpability combined with a suitable elasticity.

According to the invention, the said method comprises simultaneously and concurrently spinning through one spinneret orifice (a) a conventional polyamide, and (b) a polyamide copolycondensate containing a heterocyclic ring composed of from 5 to 6 members and having from 2 to 3 nitrogen atoms. Said copolycondensate is obtained by copolymerizing a polyamide or the monomer thereof with a salt obtained from a dicarboxylic acid and a diamine containing said heterocyclic ring, said diamine being a derivative of a compound comprised in the group consisting of piperazine and triazole.

According to a first embodiment of this invention, wherein a copolycondensate containing a piperazine ring is concerned with, the invention is characterized in that in providing the said polycondensate as (b) use is made of a salt of a diamine having the following general formula

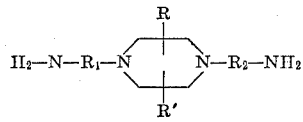

wherein R and R' represent hydrogen or methyl group and $R_1$ and $R_2$ represent hydrocarbon residue having 1 to 3 carbon atoms and a dicarboxylic acid or mixture of said diamine and said acid in the same mole (II) with a well known polyamide or the starting materials thereof (I).

Namely, according to said first embodiment of the invention, the polymers to be bonded with conventional polyamides are polyamidic copolycondensates containing piperazine ring and the composition of these copolycondensates occupies the important part of the invention and consists of, for example, the following two components (I) and (II).

As the component (I), mention may be made of the same polymer as the other polyamide to be bonded therewith or of the components of the polyamide, for example, ε-caprolactam, aminocaproic acid, enantholactam, aminoheptanoic acid, cyclooctanone isooxime, ω-aminododecanoic acid, adipic acid, sebacic acid, dodecane dibasic acids, tetramethylenediamine, hexamethylenediamine, nonamethylenediamine, undecamethylenediamine, dodecamethylenediamine, piperazine, methaxylylenediamine, paraxylylenediamine.

As the other component (II) salts of the above described diamines containing piperazine ring and dicarboxylic acids or the mixture of these amines and acids in the same mole are effective. These diamines containing piperazine ring include the following compounds.

N,N'-di(aminomethyl)piperazine,
N,N'-di(aminomethyl)methylpiperazine,
N,N'-di(aminomethyl)-2,5-dimethylpiperazine,
N,N'-di(aminomethyl)-2,6-dimethylpiperazine,
N,N'-di(β-aminoethyl)piperazine
N,N'-di(β-aminoethyl)methylpiperazine,
N,N'-di(β-aminoethyl)-2,5-dimethylpiperazine,
N-(aminomethyl)-N'-(β-aminoethyl)piperazine,
N-(aminomethyl)-N'-(β-aminoethyl) - 3 - methylpiperazine,
N,N'-di(γ-aminopropyl)piperazine,
N,N'-di(γ-aminopropyl)methylpiperazine,
N,N'-di(γ-aminopropyl)-2,5-dimethylpiperazine,
N,N'-di(γ-aminopropyl)-2,6-dimethylpiperazine,
N-(γ-aminopropyl)-N'-(aminomethyl)piperazine
N - (γ-aminopropyl)-N'-(aminomethyl)-2-methylpiperazine,
N - (γ-aminopropyl)-N'-(aminomethyl)-3-methylpiperazine,
N - (γ-aminopropyl)-N'-(aminomethyl)-2,5-dimethylpiperazine,
N-(γ-aminopropyl)-N'-(β-aminoethyl)piperazine,
N - (γ - aminopropyl)-N'-(β-aminoethyl)-2-methylpiperazine,
N - (γ-aminopropyl)-N'-(β-aminoethyl) - 2,5 - dimethylpiperazine.

Furthermore, the dicarboxylic acids to be used for the component (II), mention may be made of aliphatic dicarboxylic acids having more than four carbon atoms, such as, succinic acid, glutaric acid, adipic acid, pimelic acid, suberic acid, azelaic acid sebacic acid, terephthalic acid, hexahydroterephthalic acid, p-benzene-diacetic acid. These acids can be used as methyl or ethyl ester.

The production of the polyamidic copolycondensates containing piperazine ring according to this first embodiment of the invention from the components (I) and (II) can be attained in substantially the same manner as that of conventional polyamidic polycondensates, wherein the mixture of the above described components for the polycondensation are condensated by heating under an inert gas atmosphere, such as, gaseous nitrogen, carbon dioxide, etc., if necessary, under a pressure or a reduced pressure. The crimpability of the composite filament obtained by bending these copolycondensates with the other polyamide polycondensates, is influenced depending upon the copolymerization ratio, the conjugate ratio of these two polymers and the kind of polymers to be used.

In order to prevent stick of filaments taken up on a bobbin following to the object of the invention, the components of polycondensation (I) should be more than 80 mol percent of the total components for the condensation. The conjugate ratio can be selected suitably depending upon the purpose within the range of more than 5% by weight of the above described copolymer based on the total polymers. According to the invention, in spinning the composite filament the two polymer melts to be bonded are introduced into two gear pumps and extruded simultaneously through a same orifice in delivery amounts corresponding to the conjugate ratio into air to form a unitary filament and then the resulting filament is taken up and drawn in a conventional process.

When the tow or staple of the fibres thus obtained is exposed in hot air, hot water or hot steam, excellent spiral three dimensional crimps can be developed.

According to the other embodiment of the invention, concerned with a polycondensate containing a triazole ring, one polymer to be bonded is poly-ε-caprolactam (referred to as nylon-6, hereinafter) or polyhexamethylene adipamide (referred to as nylon-66, hereinafter) and the other polymer to be bonded is a polymer obtained by copolycondensating a salt of 4 - amino - 3,5 - di(aminoalkyl) 1,2,4 triazole and an aromatic dicarboxylic acid, an alicyclic dicarboxylic acid or a mixture of these acids with ε-caprolactam, said salt in the copolycondensate being 3 to 50% by weight. When the two polyamidic polycondensates to be bonded are referred to as polymer A and polymer B. As the polymer A, use is made of nylon-6 or nylon-66 and as the polymer B, a copolyamide which is obtained by copolymerizing a salt of a 4-amino-3,5-di-(aminoalkyl)-1,2,4-triazole with an aromatic dicarboxylic acid, an alicyclic dicarboxylic acid or a mixture of these acids with ε-caprolactam, said salts in the polymer B being within the range of 3 to 50% by weight. Furthermore, although an amount of more than 50% of the polymer can be mixed therein, it is difficult to obtain good polymer owing to cross linkage and colouring. Moreover, if necessary, starting materials of a conventional polyamide can be added in a trace additionally to one of the above polymers A and B or both of them to improve yarn unwinding property.

The composite filament obtained according to the invention has an extremely excellent bonding property, while in crimpability, bulkiness, elasticity and dyeing affinity said filament has remarkably improved characteristics as compared with conventional crimped polyamide fibre. This is presumably based on the fact that the polymer A consists mainly of linear polyamide, while the polymer B is polyamide containing triazole ring and aromatic ring or aliphatic ring which is considerably different in the skeleton from the polymer A, so that said two polymers are different in the state of crystallization, therefore, remarkable three dimensional crimps can be obtained by heat shrinkage after drawing.

According to this other embodiment of the invention, 4-amino-3,5-di(aminoalkyl)-1,2,4-triazole has the following general formula:

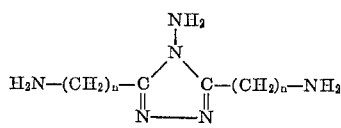

wherein $n$ is an integer of 1 to 11.

As the aromatic dicarboxylic acids, use may be made of, for example, isophthalic acid, terephthalic acid or naphthalene dicarboxylic acids, such as 1,3-naphthalene dicarboxylic acid, 1,4-naphthalene dicarboxylic acid and the other similar dicarboxylic acid having one or more aromatic groups, for example, the compounds having the general formula:

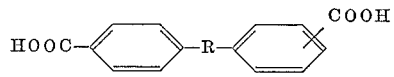

wherein R is $-(CH_2)_n-$, $-O(CH_2)_nO-$, $-CH_2)_nO(CH_2)_n-$, $-S(CH_2)_nS-$

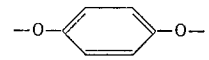

and $n$ is 0 or an integer of 1 or more and the alkyl, aryl and acryl derivatives thereof.

As the alicyclic dicarboxylic acids, mention may be made of ones obtained by hydrogenation of the aromatic radical of the above described aromatic dicarboxylic acids, for example, 1,3-dicyclohexane dicarboxylic acid, 1,4-cyclohexane dicarboxylic acid, etc.

The method for polymerizing salts consisting of the amino triazole compounds and the aromatic or alicyclic dicarboxylic acid with ε-caprolactam can be effected in substantially the same manner as the method of producing the previously known polyamidic polycondensates.

In this case, the above described salts can be used solely or in mixture of the several salts. Namely, ε-caprolactam is mixed with the above described salt(s) and the resulting mixture is heated and melted in an inert gas, such as, gaseous nitrogen, carbon dioxide, etc. under normal pressure, or if necessary, under a reduced pressure or a pressure to effect polycondensation. When adding the above described additional copolycondensatable components, the process can be carried out in substantially the same manner as described above.

The conjugate ratio of two polymers to be bonded can be selected suitably within the range by weight of 1:10 to 10:1 depending upon the purpose. In order to bond the two polymers, they are separately melted and then extruded through the same orifice or two adjacent orifices in delivery amounts corresponding to the conjugate ratio by means of gear pumps to bond the two polymers and the resulting filament is taken up and drawn in a conventional process. Then the resulting filament is taken up and drawn by conventional process. The fibre thus obtained can be heat shrunk by steam, hot water, air, etc. to develop strong and fast spiral crimps.

All composite filaments obtained by this invention have excellent bonding property and fast and improved crimpability and furthermore, superior affinity for acid dyestuff, direct dyestuff, dispersion dyestuff and basic dyestuff than conventional polyamide fibres.

In addition, the new filaments of the type having an aromatic or alicyclic group have a superior elasticity than aliphatic polyamide fibres, such as conventional nylon-6 and nylon-66 and, furthermore, the composite filaments of the type having amino triazole ring, have improved dyeing affinity.

The fibre obtained by the method of the invention has the same fastness against discolouration, colouring, etc. as nylon-6 or nylon-66.

The invention will be explained in detail by the following specific examples, wherein Examples 1 to 9 inclusive relate to said first embodiment of the invention, whilst Examples 10 to 14 relate to the said other embodiment thereof, said examples being however not anyway limiting of the scope of this invention, except insofar as set forth in the appended claims.

EXAMPLE 1

To a conc. aqueous solution of a salt of N,N'-di(γ-aminopropyl)piperazine with adipic acid was added dropwise hydrogen bromide gradually to pH of 6.5 and then from the resulting mixture water is distilled off under a reduced pressure and the reaction product was washed with ethanol to obtain white product. 0.2 mole of the resulting product and 1 mole of hexamethylenediammonium adipate were polymerized by heating at 260° C. for 4 hours and then the resulting polymer and nylon-66 were conjugate spun in a conjugate ratio of 1:1 (by weight) and the resulting filament was cold-drawn 4.2 times its original length and then subjected to hot steam treatment under a tensionless state to obtain composite filament having 10 deniers, which had the following properties.

Number of crimps _____ 21.5
Crimp degree _____percent__ 45.1
Crimp elasticity _____do____ 87.6

Furthermore, the dyeing affinity of this fibre was excellent for basic dyestuff, direct dyestuff and dispersion dyestuff as well as acidic dyestuff. When 1.5 g. of this fibre were dipped in 100 cc. of neutral dyeing bath of 0.01% of Anthraquinone Blue BWF, the fibre absorbed the dyestuff completely at 30° C. in 10 minutes.

EXAMPLE 2

The composite filament obtained in a conjugate ratio of 1:10 of the polyamidic copolycondensate containing piperazine ring and nylon-66 in Example 1 had the following properties:

Number of crimps _____ 16.5
Crimp degree _____percent__ 40.3
Crimp elasticity _____do____ 70.0

EXAMPLE 3

To 0.05 mole of N,N'-di($\gamma$-aminopropyl)piperazine, 0.05 mole of adipic acid and 1 mole of caprolactam were added 2 mole of water and the resulting mixture was heated at 170° C. under nitrogen atmosphere under a pressure of 20 kg./cm.$^2$ for 2 hours and then heated at 240° C. under normal pressure for 3 hours to obtain a polymer. The resulting polymers and nylon-6 were conjugate spun in a conjugate ratio of 1:1 and the resulting filament was drawn and heat treated in the same manner as described in Example 1 to obtain a composite filament having 15 deniers, which had the following properties:

Number of crimps _____ 24.5
Crimp degree _____percent__ 58.6
Crimp elasticity _____do____ 88.9

When 1 g. of this fibre was dipped in 100 cc. of dyeing bath of 0.01% of Anthraquinone Blue BWF (made by Du Pont, U.S.A.) at 40° C. and having pH of 6.5, it absorbed the dyestuff completely in 5 minutes.

EXAMPLE 4

The same polyamidic copolycondensate as in Example 3 and nylon-6 were conjugate spun in a conjugate ratio of 5:95 and the resulting filament was hot drawn 5 times its original length and then was subjected to a dry heat treatment at 130° C. in a tensionless state to obtain a composite filament having 10 deniers, which had the following properties:

Number of crimps _____ 10.7
Crimp degree _____percent__ 52.1
Crimp elasticity _____do____ 70.2

EXAMPLE 5

The polymer obtained by heating 0.1 mole of a salt of N,N'-di($\gamma$-aminopropyl)piperazine with adipic acid and 1 mole of caprolactam in gaseous carbon dioxide atmosphere under normal pressure at 240° C. for 5 hours and nylon-6 were conjugate spun in a conjugate ratio of 2:3 and the resulting filament was cold drawn 4.5 times its original length and then treated with hot water in a tensionless state to obtain a composite filament having the following properties:

Number of crimps _____ 17.6
Crimp degree _____percent__ 56.1
Crimp elasticity _____do____ 85.9

EXAMPLE 6

In Example 5, 1 mole of caprolactam was previously polymerized and the resulting polymer was added with 0.1 mole of a salt of N,N'-di($\gamma$-aminopropyl)piperazine with adipic acid and the resulting mixture was copolymerized by heating to obtain a polymer, which was conjugate spun with nylon-6 to obtain the fibre having the following properties:

Number of crimps _____ 15.2
Crimp degree _____percent__ 52.4
Crimp elasticity _____do____ 83.7

EXAMPLE 7

A polymer obtained by condensating 0.02 mole of salt of N,N'-di($\gamma$-aminopropyl)piperazine with succinic acid and 1 mole of caprolactam in gaseous nitrogen at 240° C. for 3 hours and nylon-6 were conjugate spun in a conjugate ratio of 1:1 and the resulting filament was cold drawn 4.5 times its original length and then subjected to a dry heat treatment at 120° C. to obtain a composite filament having 15 deniers, which had the following properties:

Number of crimps _____ 22.3
Crimp degree _____percent__ 51.7
Crimp elasticity _____do____ 85.8

EXAMPLE 8

0.1 mole of a salt of N,N'-di($\gamma$-aminopropyl)piperazine with adipic acid and 1 mole of a salt of hexamethylenediamine with sebacic acid were dissolved in metacresol and the resulting solution was heated at 200° C. for 1 hour and further at 240° C. for 5 hours to obtain a polymer, which was conjugate spun with nylon-610 in a conjugate ratio of 1:1. The resulting filament was drawn and subjected to a heat treatment in the same manner as described in Example 1 to obtain a composite filament of 20 deniers, which had the following properties:

Number of crimps _____ 15.8
Crimp degree _____percent__ 50.8
Crimp elasticity _____do____ 89.2

EXAMPLE 9

0.03 mole of a salt of N,N'-di($\gamma$-aminopropyl)-2,5-dimethyl piperazine with adipic acid and 1 mole of amino heptanic acid were heated at 145° C. for 8 hours and then under a reduced pressure of 10 mm. Hg for 80 minutes to obtain a polymer, which was conjugate spun with nylon-7 in a conjugate ratio of 1:1. The resulting filament was drawn and heat treated in the same manner as described in Example 4 to obtain a composite filament of 10 deniers, which had the following properties:

Number of crimps _____ 18.6
Crimp degree _____percent__ 56.2
Crimp elasticity _____do____ 80.2

EXAMPLE 10

10 g. of salt of 4-amino-3,5-di($\epsilon$-aminopentyl)-1,2,4-triazole and terephthalic acid and 90 g. of $\epsilon$-caprolactam were mixed and polycondensated by heating at 245° C. in gaseous carbon dioxide atmosphere for 7 hours and the polymer thus obtained and nylon-6 were conjugate spun in a conjugate ratio by weight of 1:1 and then the resulting filament as drawn 4.2 times its original length at room temperature and thereafter dipped in hot water at 95° C. for 10 minutes and then dried. The resulting fibre has the following crimp maintaining property [1] under tension.

Furthermore, for the comparison, 10 g. of salt of hexamethylenediamine and adipic acid and 90 g. of ε-caprolactam were subjected to copolymerization, spinning, drawing and hot water treatments in the same manner as described above and the crimp maintaining property of the resulting fibre is also shown in the following table.

| Load (mg./d.) | Percent of shrinkage in longitudinal direction of the fibre (percent) | |
|---|---|---|
| | Sample of this example | Comparative sample |
| 0 | 77.0 | 75.0 |
| 0.07 | 72.0 | 54.8 |
| 0.14 | 65.8 | 43.0 |
| 0.70 | 34.5 | 21.5 |
| 1.40 | 25.0 | 17.1 |

The crimp maintaining property was expressed by "percent of shrinkage," which was determined as follows:

When the above described composite filament yarn was dyed in a bath ratio of 50 times by using a dyeing solution comprising 3% of Solway Blue BN 150 (made by I.C.I.) and 3% of acetic acid at 90° C. for 1 hour, the dyeing ratio was 76.0%.

Furthermore, when nylon-6, as a comparative sample, was dyed under the same condition, the dyeing ratio of 40.0%.

EXAMPLE 11

From 4-amino-3,5-(ε-aminopentyl)-1,2,4-triazole and isophthalic acid a salt was produced in a conventional process and the copolymerization, spinning, drawing and hot water treatments were effected in the same manner as described in Example 10. The fibre thus obtained had the following crimp maintaining property under tension.

| Load (mg./d.) | Percent of shrinkage in longitudinal direction of the fibre (percent) |
|---|---|
| 0 | 85.0 |
| 0.07 | 82.0 |
| 0.14 | 75.5 |
| 0.7 | 39.5 |
| 1.4 | 27.3 |

EXAMPLE 12

From 4 - amino - 3,5-di-(ε-aminopentyl)-1,2,4-triazole and 1,2-bis(p-carboxyphenoxy)ethane, a salt was produced in a conventional process and the copolymerization was effected in the same manner as described in Example 10. The resulting polymer and nylon-66 were conjugate spun in a conjugate ratio by weight of 3:1 and the resulting filaments were drawn and treated with hot water as described in Example 10. The resulting fibre had the following crimp maintaining property under tension.

| Load (mg./d.) | Percent of shrinkage in longitudinal direction of the fibre (percent) |
|---|---|
| 0 | 80.1 |
| 0.07 | 71.0 |
| 0.14 | 59.5 |
| 0.7 | 27.5 |
| 1.4 | 21.3 |

EXAMPLE 13

From 4 - amino - 3,5-di(γ-aminopropyl)-1,2,4-triazole and 1,4-cyclohexane dicarboxylic acid, a salt was produced in a conventional process and 20 g. of the resulting salt and 80 g. of ε-caprolactam were mixed. The resulting mixture was subjected to copolymerization, spinning, ---
[1] A bundle of 40 filaments (length of 30 cm.) was treated with hot water at 95° C. for 10 minutes under various loads to develop crimps and then the bundle was dried at room temperature. Then, the ratio of the length of the dried bundle to that of the original bundle was calculated.

drawing, and heat treatments in the same manner as described in Example 10. The resulting fibre had the following crimp maintaining property under tension.

| Load (mg./d.) | Percent of shrinkage in longitudinal direction of the fibre (percent) |
|---|---|
| 0 | 84.3 |
| 0.07 | 82.2 |
| 0.14 | 75.5 |
| 0.70 | 45.0 |
| 1.40 | 30.7 |

EXAMPLE 14

4 - amino - 3,5 - di(ω-aminoundecyl)-1,2,4-triazole and terephthalic acid, a salt was produced in a conventional process and 40 g. of the resulting salt and 60 g. of ε-caprolactam were mixed. The resulting mixture was subjected to copolymerization, spinning, drawing, and heat treatments in the same manner as described in Example 10. The resulting fibre had the following crimp maintaining property.

| Load (mg./d.) | Percent of shrinkage in longitudinal direction of the fibre (percent) |
|---|---|
| 0 | 86.2 |
| 0.07 | 83.0 |
| 0.14 | 76.3 |
| 0.70 | 46.1 |
| 1.40 | 31.5 |

What we claim is:

1. A method of producing polyamide fibrous material having three dimensional crimpability, by melt spinning process wherein two different polycondensates are simultaneously and concurrently spun through one spinneret orifice, comprising providing and concurrently spinning in said orifice
    (a) a polyamide, and
    (b) a polyamidic copolycondensate containing a 5 or 6 member heterocyclic ring including 2 or 3 nitrogen atoms, and obtained by copolymerizing ($b_1$) a polyamide, or the monomer thereof, with ($b_2$) a salt obtained from a dicarboxylic acid and an amine containing said heterocyclic ring.

2. The method of claim 1, wherein said amine is a derivative of triazole or piperazine.

3. The method of claim 1, wherein said amine is a diamine having the formula

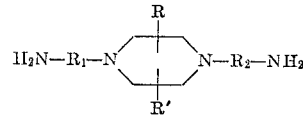

wherein R and R' represent hydrogen or methyl group and $R_1$ and $R_2$ represent hydrocarbon residue having 1 to 3 carbon atoms.

4. The method of claim 3, wherein the said polyamide at ($b_1$) is the same polyamide as at (a).

5. The method of claim 1, wherein the said amine consists of 4-amino-3,5-di(aminoalkyl)-1,2,4-triazole having the formula

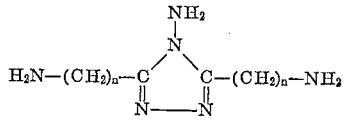

wherein $n$ is an integer of 1 to 11.

6. The method of claim 5, wherein the said polyamide at ($b_1$) is ε-polycaprolactam.

7. The method of claim 1, wherein said polyamidic copolycondensate is obtained by copolymerizing a polyamide selected from the group consisting of nylon-6, nylon-66, nylon-610 and nylon-7, with a salt of an amine containing a piperazine ring with a dicarboxylic acid.

8. The method of claim 7, wherein said copolycondensate is obtained by copolymerizing one mole of said polyamide with from 0.02 to 0.2 mole of said salt.

9. The method of claim 1, wherein said polyamide is selected from the group consisting of nylon-6 and nylon-66, and the said copolycondensate at (b) is a copolymer of ε-caprolactam with a salt of an amine containing a triazole ring with a dicarboxylic acid.

10. The method of claim 9, wherein the said copolycondensate is obtained by copolymerization of from 10 to 40 parts by weight of said salt with from 90 to 60 parts by weight of ε-caprolactam.

11. The method of claim 7, wherein the said dicarboxylic acid consists of an aliphatic dicarboxylic acid having more than four carbon atoms.

12. The method of claim 9, wherein the said dicarboxylic acid is selected from the group consisting of aromatic dicarboxylic acid, alicyclic dicarboxylic acid and a mixture of said aromatic and alicyclic acids.

References Cited

UNITED STATES PATENTS

| 2,904,536 | 9/1959 | Rerth. |
| 3,244,785 | 4/1966 | Hollandsworth _ _ _ _ 264—168 X |
| 3,264,390 | 8/1966 | Tanner _ _ _ _ _ _ _ _ _ _ _ _ 264—171 |
| 3,343,241 | 9/1967 | Gajjar _ _ _ _ _ _ _ _ _ _ _ 264—168 X |
| 3,365,873 | 1/1968 | Matsumoto et al. _ _ _ _ _ 57—157 |
| 3,376,369 | 4/1968 | Fisher. |

FOREIGN PATENTS

| 732,525 | 4/1966 | Canada. |

JULIUS FROME, Primary Examiner

J. H. WOO, Assistant Examiner

U.S. Cl. X.R.

161—173; 260—78; 264—171, 78